United States Patent [19]

Vavra et al.

[11] Patent Number: 5,279,154
[45] Date of Patent: Jan. 18, 1994

[54] THERMAL MASS FLOW SENSOR

[75] Inventors: Randall J. Vavra, Orange; Lam T. Nguyen; Erik Q. Tran, both of Garden Grove, all of Calif.

[73] Assignee: Unit Instruments, Inc., Orange, Calif.

[21] Appl. No.: 947,889

[22] Filed: Sep. 18, 1992

Related U.S. Application Data

[63] Continuation of Ser. No. 614,098, Nov. 14, 1990, abandoned, which is a continuation-in-part of Ser. No. 537,571, Jun. 14, 1990, abandoned.

[51] Int. Cl.⁵ .................. G01F 1/68; G01F 5/00
[52] U.S. Cl. .................................... 73/202.5
[58] Field of Search .......... 73/204.11, 204.12, 204.18, 73/202, 202.5; 137/486, 487.5

[56] References Cited

U.S. PATENT DOCUMENTS 2,586,060  2/1952  Kronberger ................. 73/202
2,594,618  4/1952  Booth, Jr. ................. 73/204.12
4,056,975  11/1977 LeMay ...................... 73/202
4,686,856  8/1987  Vavra et al. ............... 73/204.19

Primary Examiner—Herbert Goldstein
Attorney, Agent, or Firm—Fitch, Even, Tabin & Flannery

[57] ABSTRACT

A vertical flow thermal mass flow sensor for a vertical flow thermal mass flow meter of a vertical flow thermal mass flow controller has a sensor tube having a gas inlet for receiving a gas to be metered. The sensor tube includes a first curved convection trap and a second curved convection trap for preventing convective flow of the gas through the sensor tube. A thermally responsive winding is wound about the sensor tube and is energized from a source of electrical energy. The resistance of the thermally responsive winding is responsive to the rate of flow of the gas through the sensor tube and provides an indication thereof.

10 Claims, 5 Drawing Sheets

THERMAL MASS FLOW SENSOR

CROSS-REFERENCE TO RELATED APPLICATION

This application is a continuation of application Ser. No. 614,098 filed Nov. 14, 1990, now abandoned which is a continuation-in-part of copending application Ser. No. 537,571, filed Jun. 14, 1990 now abandoned.

BACKGROUND OF THE INVENTION

The invention relates generally to thermal mass flow sensors and in particular to a tubular vertical flow thermal mass flow sensor for a vertical flow thermal mass flow meter or thermal mass flow controller. The tubular vertical flow thermal mass flow sensor is compensated for convection induced errors which are particularly prevalent with vertically oriented conventional thermal mass flow meters at zero and low flow rates.

In the manufacture of integrated circuits, it is necessary to perform multiple process steps including epitaxial growth steps, vapor deposition steps, diffusion steps and etching steps. All of these process steps are dependent upon chemical reactions with a silicon wafer in a reaction chamber or chemical reactions between or among the process gases in the reaction chamber. For instance, dichlorosilane and trichlorosilane are used in the epitaxial growth of silicon upon a substrate. If silicon is to be doped, phosphorus oxychloride, diborane, arsine and/or phosphine may be employed as dopant carrying gases in combination with silane compounds. Oxygen may be metered into a heated reaction chamber to cause thermal oxidation of silicon to take place to form silicon oxide. Silicon nitride may be deposited upon a silicon wafer by the reaction of ammonia and dichlorosilane. Wafers may be etched by gases such as sulphur hexafluoride excited in plasma reactors. The thickness and electrical characteristics of the substances deposited or grown on the wafer are influenced in part by the amount of reactant gas within the reactor. In order to control the amount of reactant gas in the reactor, mass flow controllers are connected between gas sources and the reactor to meter the flow of gases into the reactor to insure that the semiconductor manufacturing processes are performed properly. Failure to meter the gases properly may result in defective integrated circuits which must be scrapped. Mass flow controllers also may be used to meter anesthetic gases for use in medicine and for other precision process and analysis operations.

In the generally accepted terminology of the flow measurement industry a flow meter is an instrument for measuring the rate of flow of a gas, and a flow controller is a flow meter with a control valve and a feedback circuit combined to not only measure the flow but regulate it to a value that can be electronically set or manipulated. A flow sensor is a transducing element used within a flow meter or flow controller. It produces an electrical signal indicative of the rate of flow of a flow of fluid such as gas flowing through the sensor.

Specifically such sensors include a small diameter tube with a centrally heated region and means for sensing the temperature of the heated region at a pair of points along the tube. A flow of fluid such as gas through the heated region lowers the temperature of the upstream portion of the heated region and raises the temperature of the downstream portion of the heated region. The temperature differential results in a change in the signal, typically from a bridge including windings positioned about the heated region of the tube. A problem with such sensors is that the gas within the tube is heated which may give rise to gas convection currents within the tube.

Typically only a fraction of the total fluid flowing through the flow meter passes through the tube. The remainder passes through a path called a bypass which restricts the flow of gas so that the mass flow rate of gas through the bypass has a known relationship to the mass flow rate of gas through the tube. Usually the bypass flow rate is a linear multiple of the flow rate through the tube.

The heated tube and the relatively cool bypass form a loop in which convective flow or circulation may be established even when the valve of a mass flow controller is closed. Gas may convectively flow out one end of the tube into the bypass where it cools and back into the other end of the tube where it is again heated by the winding to continue the process.

Many times the mass flow controllers are incorporated in gas shelves as part of other processing equipment such as diffusion furnaces, chemical vapor deposition equipment, sputtering equipment, plasma etchers and the like. Most mass flow controllers are mounted so that the primary gas flow path through their bypass conduits is in a substantially horizontal direction. Typical mass flow controllers include a U-shaped sensor tube having a pair of vertically oriented legs connected by a substantially horizontal leg about which a temperature sensitive heater/sensor wire is wound. The heater/sensor wire comprises a portion of an electrical bridge which is excited from a source of electrical energy and whose voltage at a tap changes as the flow of gas through the sensor tube preferentially cools the upstream portion of the sensor winding with respect to the downstream portion of the sensor winding causing a voltage shift therein. It may be appreciated that at zero flow rates, the sensor windings will heat the gas within the sensor tube, but not cause any net convection of the gas in one direction, thereby avoiding convective flow through the U-tube.

Those skilled in the art have also attempted to use these conventional mass flow meters and controllers in applications where the flow through the mass flow meter, in particular through the bypass portion, is substantially in a vertical direction, thereby causing the sensor portion of the sensor tube also to be vertically oriented. The sensor portion is connected to the opposite ends of the bypass by an inlet leg and an outlet leg. At zero flow conditions when the heater-sensor winding is energized transferring heat to the gas in the sensor tube, the density of the gas is reduced relative to the density of the gas in the inlet and outlet legs causing the less dense gas to exit the upper portion of the sensor tube and drawing in denser gas at the bottom, causing the sensor tube to act as a chimney thereby creating a convective flow causing a shift in the sensed bridge voltage when in fact there was no net flow through the assembly. This results in a flow measurement error which is particularly significant when the flow rate is zero, and leads to a corresponding error at any flow rate.

Attempts have been made in the past to avoid this problem, for instance, with the apparatus disclosed in U.S. Pat. No. 4,056,975 to LeMay for Mass Flow Sensor System. The mass flow sensor system is difficult to manufacture in practice. One of the problems associated with the LeMay system is that the sensing wire comprising the upstream sensor 17 and the downstream sensor 18 is wound around a curved portion of the sensing tube 12. It is relatively difficult to obtain repeatable thermal characteristics in manufacturing sensors where the windings are placed around a straight section of the tubes, it is even more difficult to do so around curved sections. Thus, it has been found in practice that the LeMay system is impractical for reducing the convection effects on a commercial basis.

What is needed is a mass flow controller having a mass flow meter with a tube type sensor which may be oriented with its bypass substantially vertical and with the inlet to the system oriented either to cause the flow through the bypass to flow downward or flow upward and which is resistant to convective effects.

SUMMARY OF THE INVENTION

A vertical flow thermal mass flow sensor for a vertical flow thermal mass flow meter of a vertical flow thermal mass flow controller has a sensor tube having a gas inlet for receiving a process gas to be metered. The gas inlet receives gas from a bypass. The sensor tube includes a first curved convection trap for preventing convective flow of the gas in a first direction and a second curved convection trap for preventing convective flow of the gas in an opposite direction to the first direction. A thermally responsive winding is wound about a straight section of the sensor tube and may be energized from a source of electrical energy both to heat that section above ambient temperature and to effectively measure the resistance of the windings. The resistance of the thermally responsive winding changes with changes in rates of flow of gas through the sensor tube. Heating of the gas within the sensor tube at zero flow through the bypass does not cause net convection effects to occur therein and avoids zero offset. The sensor tube also has a gas outlet for exhausting gas back into the bypass of the mass flow meter. The gas then flows from the mass flow meter into a valve where its flow rate is modulated in accordance with an arrow signal determined from a set point signal and the measured gas flow rate from the sensor tube. The use of the double oppositely curved convective traps in the sensor tube prevents net convective flow through the sensor tube, even though one end of the sensor tube is higher than the other end of the sensor tube. For instance, the inlet may be higher than the gas outlet or vice versa. The convective flow traps prevent the chimney effect from causing the net flow. In addition, the portion of the sensor tube having the temperature sensitive wire wrapped thereabout is a straight portion of tubing which allows the wire to be easily and uniformly wrapped using conventional techniques.

It is a principal aspect of the present invention to provide a zero offset thermal mass flow sensor for a vertical flow thermal mass flow meter.

DETAILED DESCRIPTION OF THE PREFERRED EMBODIMENTS

Figure 2:
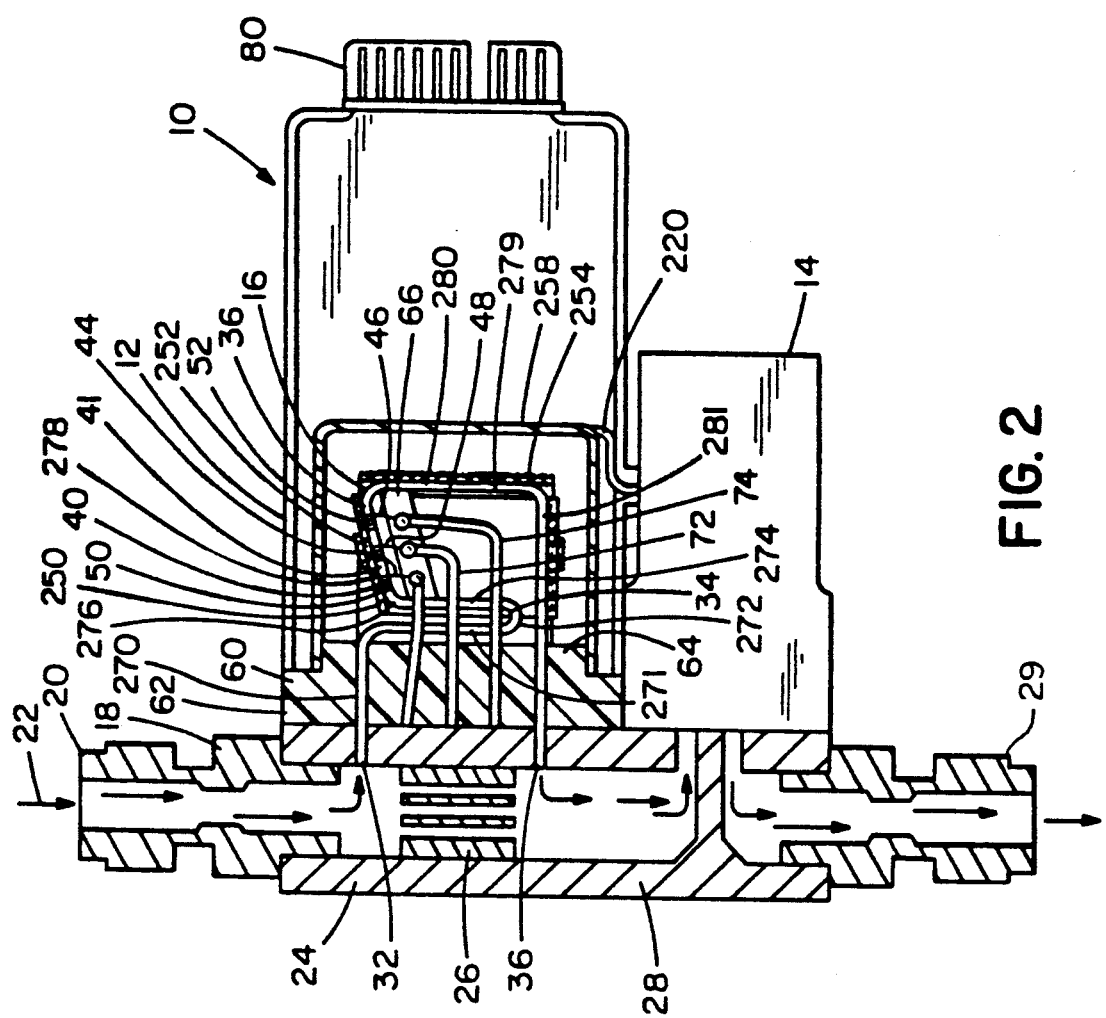
FIG. 2 is a side elevational view, partially in section, of a vertical flow thermal mass flow controller having a vertical flow thermal mass flow meter including the thermal mass flow sensor shown in FIG. 1.
Figure 1:
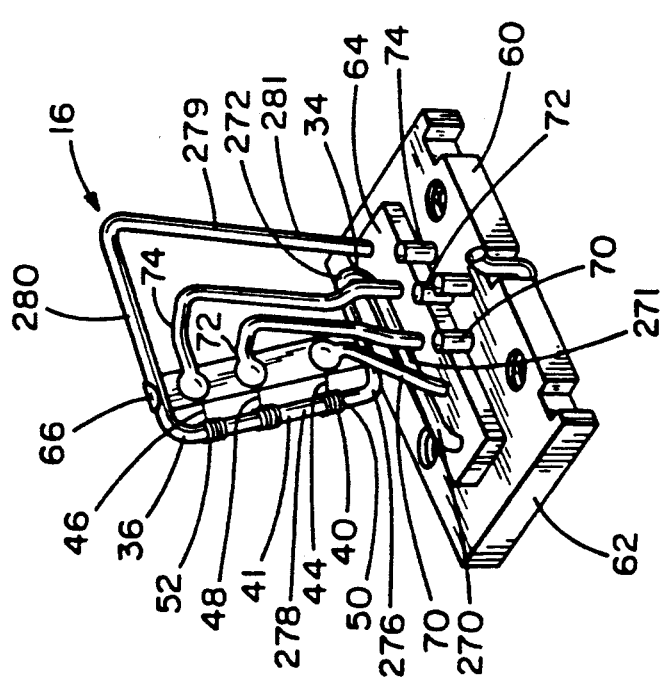
FIG. 1 is an isometric view of a sensor tube, resistance windings and a sensor base of a thermal mass flow sensor for use in a vertical flow thermal mass flow meter.

Referring now to the drawings and especially to FIG. 2, a vertical flow thermal mass flow controller embodying the present invention and generally identified by numeral 10 is shown therein. The vertical flow thermal mass flow controller 10 has a vertical flow thermal mass flow meter 12 for receiving a flow of fluid such as gas and means for modulating the flow of fluid comprising a valve 14 connected to the thermal mass flow meter 12. The valve 14 controls the flow of gas through the vertical flow mass flow meter 12 in response to a flow control signal from the vertical flow thermal mass flow meter 12. A thermal mass flow sensor 16 is included in the mass flow meter 12 and is coupled by a bypass flow path or bypass 18, extending in a bypass direction, to receive a portion of the gas flowing therethrough. In the drawing figures it is to be understood that the mass flow controller is positioned with the fluid flow being substantially vertical through the bypass flow path 18 thereof.

Referring now to FIG. 2, the mass flow controller 10 includes a fluid or gas main inlet 20 which receives a flow of gas 22 from a source such as a pressurized tank or the like. The gas may include dry nitrogen, oxygen, hydrogen, ammonia, silane, dichlorosilane, trichlorosilane vapor in nitrogen, diborane, phosphorus oxychloride, arsine, phosphine, sulfur hexafluoride and the like. The bypass 18 has an upstream portion 24 connected to the gas inlet 20. A flow restricter 26 is connected to the upstream portion 24 and a downstream portion 28 is connected to the flow restricter 26. The flow restricter 26 provides a pressure drop so that a portion of the gas 22 flowing into the mass flow controller 10 is fed to the thermal mass flow sensor 16 for the measurement of the flow rate thereby. The gas 22 then flows into the valve 14, which modulates or controls its flow rate, and out through a fluid or gas main outlet 29. The bypass 18, the gas main inlet 22, the gas main outlet 29 and the valve 14 are well known in the flow controller art.

The thermal mass flow sensor 16 has a unitary metal tube or sensor tube 30 through a portion of the gas flowing through the bypass flows and which includes integrally formed, a sensor inlet 32 for receiving the portion of the flow of gas from the upstream portion 20, a first convection trap 34 through which the portion of the gas flows, a second convection trap 36 through which the portion of the gas flows and an outlet 38 which exhausts the portion of the gas flow to the downstream portion 28 of the bypass flow path 18. The sensor inlet 32 and the sensor outlet 38 are aligned parallel with the bypass direction. The sensor tube 30 is composed of 316L stainless steel alloy having a wall thickness of 0.0015 to 0.015 inch and an internal diameter of 0.005 to 0.05 inch. A thermally responsive element comprising an electrically conductive, thermally responsive winding 40 composed of a 1.5 mil nickel 120 wire which has a high thermal coefficient of resistivity is wound about a straight portion 41 of the sensor tube 30 and coupled in good thermal conduction with the tube 30. Preferably the winding 40 is adhesively secured to the straight section by a silver epoxy adhesive. The winding 40 has an end connection 44, a second end connection 46 and a center tap 48 and comprises an upstream winding 50 between the connection 44 and center tap 48 and a downstream winding 52 between the connection 46 and the center tap 48.

Figure 7:
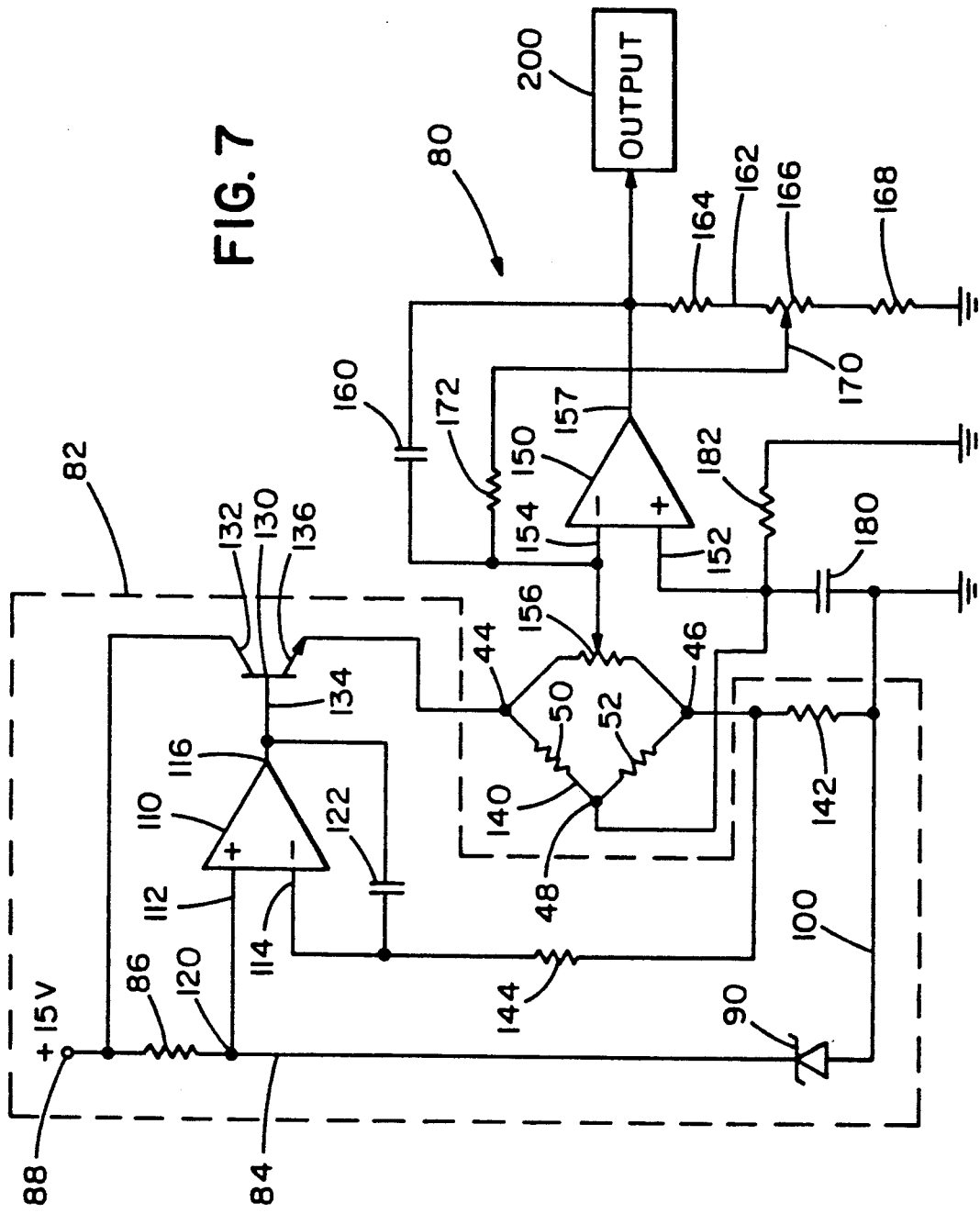
FIG. 7 is a schematic diagram of a portion of the vertical flow thermal mass flow controller shown in FIG. 2 including the resistance windings of the thermal mass flow sensor, signal processing circuitry and a valve.

The sensor tube 30 is mounted on a plastic base 60 comprising a rectangular base plate 62 and an integrally molded pedestal portion 64. In an alternative embodiment metal may be substituted for plastic in the base 60. A thermal shunt 66 comprising a copper strip connected to portions of the sensor tube adjacent the windings 50 and 52 speeds up the thermal response time of the sensor when changes in flow rate occur therethrough. The strap 66 is thermally grounded via grounding leads 70, 72 and 74 attached thereto which carry internally respectively leads 44, 48 and 46 from the windings 50 and 52. The grounded leads 70, 72 and 74 provide thermal grounds to the sensor tube 30 and also provide electrical connector tie posts for connection of the windings 50 and 52 into a bridge signal processing circuit 80, which is generally shown in FIG. 7. The signal processing circuit 80 includes a constant current generator 82 which has a regulated voltage supply 84 having a resistor 86 connected to a positive potential node 88 at a positive 15 volts potential. A Zener diode 90 is connected in series with resistor 86 and provides zero volts or ground potential at a ground line 100 to other portions of the circuit.

An operational amplifier 110 having a non-inverting input node 112, an inverting input node 114 and an output node 116, is connected at its non-inverting input node 112 to a node 120 between the resistor 86 and the Zener diode 90 to receive a regulated voltage therefrom. A capacitor 122 is connected in a minor feedback loop between the output node 116 and the inverting input node 114 to provide noise suppression. An NPN input transistor 130, having a collector 132, a base 134 and an emitter 136, is connected at the base 134 to receive the output signal from the operational amplifier 110. The collector 132 is connected to the node 88. The emitter 136 is connected to the windings 50 and 52 which comprise a portion of a bridge 140. The emitter 136 supplies a constant current to the bridge 140. The total amount of current flowing through the bridge 140 also flows through a resistor 142 to ground. A resistor 144 is connected to the junction of the resistor 142 and the bridge 140 and the potential on resistor 142 is indicative of the amount of current flowing through the bridge 140. That potential is fed by the resistor 144 back into the inverting terminal 114 to close the loop on the constant current generator. Thus, the same amount of current is always delivered to the bridge 140 despite changes in resistance of the windings 50 and 52 as gas flows through the sensor tube.

The center tap 48 of the bridge 140 is connected to an operational amplifier 150 at its non-inverting input terminal 152. An inverting input terminal 154 of operational amplifier 150 is connected to a potentiometer 156 comprising a portion the bridge 140. The potentiometer 156 may be adjusted to provide a zero adjustment for the circuit 80. The output terminal 157 of the operational amplifier 150 is connected to a feedback capacitor 160. A voltage divider network 162 comprising a resistor 164 connected to the junction between the capacitor 160 and the output node 157, a potentiometer 166 connected to the resistor 164 and a resistor 168 connected between the potentiometer 166 and ground. A sweep arm 170 of the potentiometer 166 provides an additional feedback loop through a resistor 172 to the inverting input terminal 154 of the operational amplifier 150. Movement of the sweep arm 170 alters the overall gain of the operational amplifier 150. It also alters the frequency response as the relative resistive feedback is altered with respect to the fixed impedance from the capacitor 160. Since the amplifier 150 is to function as a differential amplifier from the output of the bridge, a matching capacitor 180 and resistor 182 are connected to the non-inverting input 152, the capacitor 180 is grounded. The differential amplifier drives an output 200 which includes the valve 14. The valve 14 is connected to receive signals over a line 220.

Figure 4:
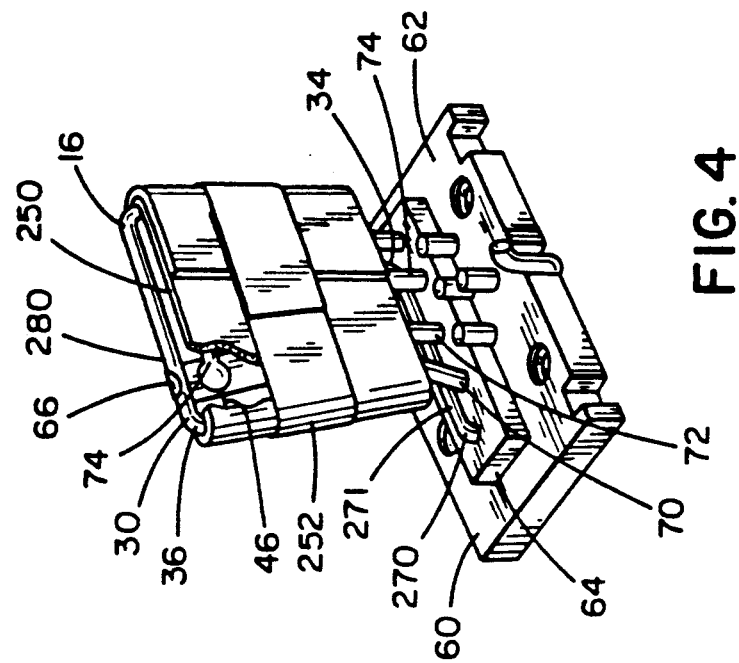
FIG. 4 is an isometric view of a sensor tube, resistance windings, a base, a thermal insulator having portions broken away of a thermal mass flow sensor for use in a vertical flow thermal mass flow meter.
Figure 3:
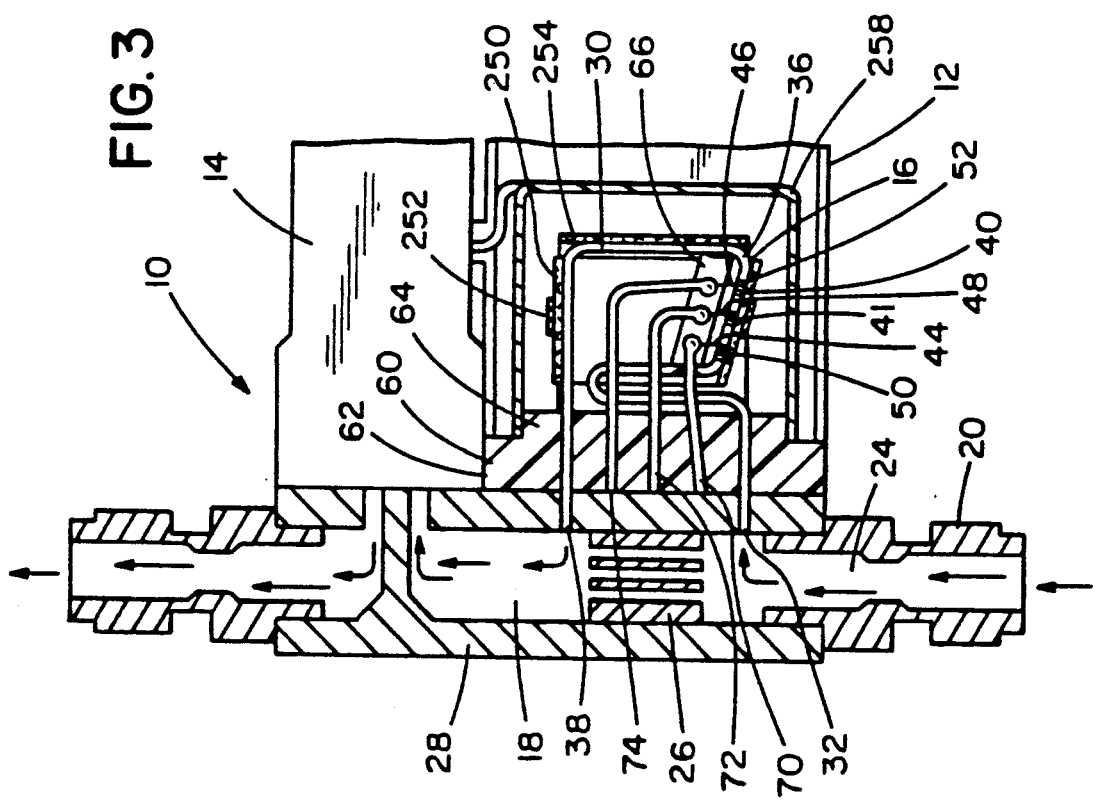
FIG. 3 is a side elevational view, partly in section, of an alternative embodiment of a vertical flow thermal mass flow controller having a vertical flow thermal mass flow meter including the thermal mass flow sensor shown in FIG. 1.
Figure 5:
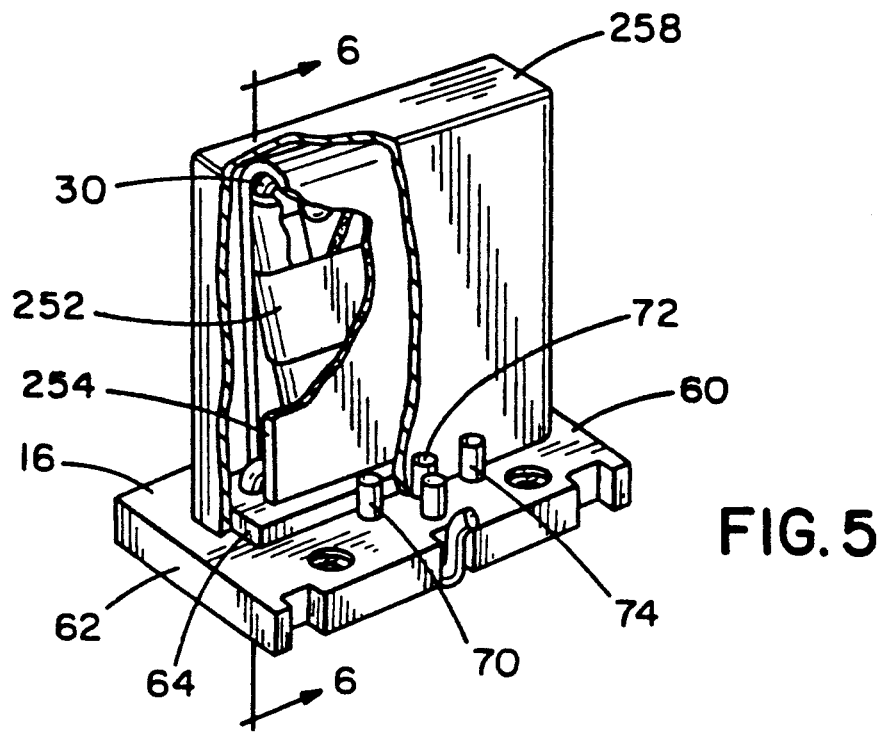
FIG. 5 is an isometric view of a sensor tube, resistance windings, a base, a thermal insulator having portions broken away, an outer insulator and closure can of a thermal mass flow sensor for use in a vertical flow thermal mass flow meter.
Figure 6:
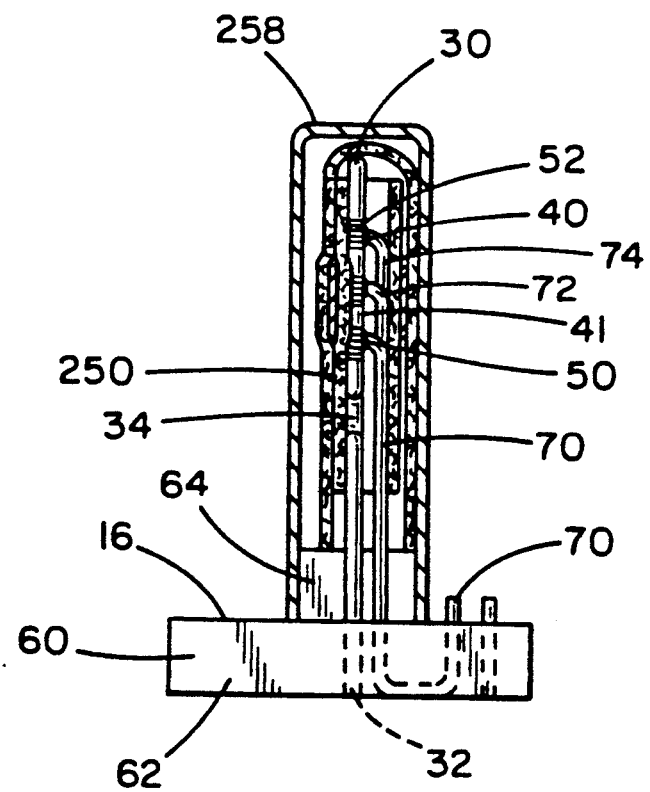
FIG. 6 is a sectional view, taken generally along line 6—6 of FIG. 5, showing details of the sensor shown in FIG. 5.

It is always important, however, to prevent unwanted effects from influencing the behavior of the sensor tube 30. One way of doing this may best be seen in FIGS. 4, 5, and 6 is to enclose the sensor tube 30 in a first insulating layer 250 which is held around the sensor tube 30 by a strap 252. A second insulating layer 254 may be wrapped over the first insulating layer and the strap 252 to further prevent outside temperature changes from affecting the sensor tube 30. The insulating layers 250 and 254 reduce or eliminate sensor perturbations caused by convective flow along the outside of the sensor tube 30. The outside insulating layer 254 may then be encased in a can or overcap 258 which snugly fits over the pedestal 64 of the base 60 to prevent air currents from the entering the can 258 and affecting the sensor tube 30.

Furthermore, the sensor tube 30 has a geometry which renders it relatively attitude insensitive. It may be appreciated that specifically the sensor tube 30 includes the first convective trap 34 and the second convective trap 36. The inlet 32 has in the preferred orientation an inlet leg 270 formed integral with it. The inlet leg 270 has a straight section 271, a 180° tubing turn 272 and a straight leg 274 is formed integral with the 180 tubing turn 272 and parallel with the tubing 271 to define the first convective trap 34. A curved tubing portion 276 is formed integral with the straight portion 274. A straight sensing leg 278, around which the windings 52 and 50 are wound, is formed integral with the curved portion 276 of the inlet leg 270. An outlet leg 279 has a straight portion 280 which is parallel with the straight portions 270 and 274, is formed integral with the curved portion 278. Finally, a last straight leg 280 is connected via a 90° curved portion 284 with the straight portion 280.

It may be appreciated that when the mass flow controller 10 is oriented in either of its vertical orientations, the legs 270, 274 and 280 of the tubing are positioned vertically. Gas which is heated by the windings 50 and 52 is trapped either in the convection trap 36 or in the convection trap 34 depending upon the direction of the net convective force on the gas. In other words, the net convective force on the gas is substantially equal to zero and internal convective circulation through the sensor tube 30 is prevented. In order to equalize the temperature differential between the sensor inlet 32 and the sensor outlet 38 the loop comprising the first convection trap 34 is provided. Furthermore, the straight portion of the tube 278 is not positioned strictly horizontally, but at a slight incline of up to 30°, but preferably 17° to 22°, to compensate for the asymmetry introduced into the sensor tube 30 by the difference between the height of the curved portion 272 and the straight-leg portion 282 of the sensor. Thus, the sensor assembly avoids setting up unwanted convection currents in either of the vertical directions in which it might be placed by the utilization of the oppositely curving convection traps 34 and 36.

Figure 8:
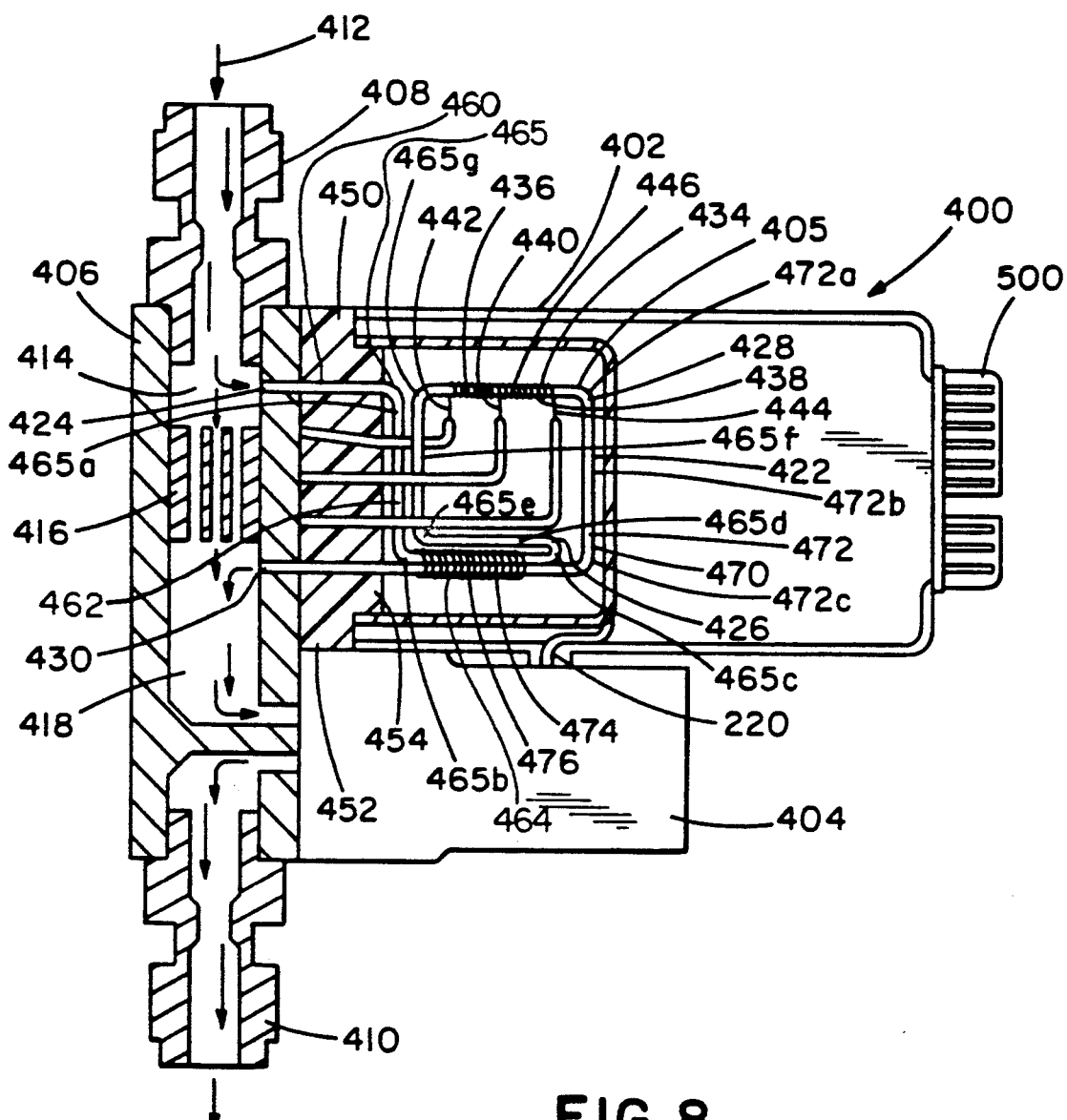
FIG. 8 is a side elevational view of an alternative thermal mass flow controller having a thermal mass flow sensor.

Referring now to FIG. 8, a still further alternative embodiment of the present invention is shown therein. A thermal mass flow controller 400 comprising a thermal mass flow meter 402 and a valve 404 is shown therein. The thermal mass flow meter includes a thermal mass flow sensor 405 which is coupled to receive a portion of a flow of gas from a bypass or bypass flow path 406 having a gas inlet 408 and a gas outlet 410. It may be appreciated that the thermal mass flow controller 400 in operation is positioned with the bypass flow path 406 positioned substantially vertically and with a flow 412 of gas or vapor therethrough moving along a vertical line from an upper portion of the thermal mass flow controller to a lower portion of the thermal mass flow controller 400. The bypass 406 includes an upstream portion 414, a flow restricter 416, and a downstream portion 418. The thermal mass flow sensor 405 has a unitary metal sensor tube 422, which includes a sensor inlet 424, a first convection trap 426, a second convection trap 428, and a sensor outlet 430. It may be appreciated that the first convection trap 426 is curved oppositely from the second convection trap 428. A thermally responsive heating sensing element or winding 434 having an upstream portion 436, a downstream portion 438, a center tap 440, a first tap 442, and a second tap 444 is wound about a portion of the second convection trap 428, more specifically a straight sensing leg 446 and alternatively comprises a part of the electrical bridge 140. The thermally responsive element 434 comprises a thermally responsive winding of thin wire having multiple turns wound around the straight sensor portion 446. It is preferentially cooled at its upstream portion 436 by a flow of gas therethrough and heated at its downstream portion 438 causing a voltage shift at tap 440. The upstream portion 436 and the downstream portion 438 are substituted for the windings 50 and 52 of circuit 80, all other portions of circuit are the same. The voltage or flow signal is received by the circuitry 80 shown in FIG. 7 which has been described in detail above. The sensor tube 422 is embedded in a plastic base 450 which, in the alternative, may be metal. The plastic base 450 has a rectangular base plate 452 and an integrally formed pedestal portion 454. A can or overcap 456 prevents the perturbation of the windings 434 and 436 by extraneous and unwanted external convection currents.

More specifically, the sensor tube 422 comprises multiple portions including the inlet 424 and the outlet 430 described above. The inlet 424 and the outlet 430 define a line substantially parallel with the bypass flow path 406. Connected to the inlet 424 is an inlet leg 460 having a thermal spacing portion 462 and a heat transfer portion 464. The heat transfer portion includes a 90 bend 465 coupled to the inlet 424. A straight leg 465a is connected to the bend 465. A 90° bend 465b is connected to the leg 465a. The thermal spacing portion 462 includes a 180° bend 465c connected to the portion 465b. A straight portion 465d is connected to the 180° bend 465c. A 90° bend 465e is connected to the straight portion 465d. A straight portion 465f is connected to the bend 465e and is parallel with the portion 465a. A 90° bend 465g is connected to the straight portion 465f. The straight sensing leg 446 is formed integrally with the inlet leg 426, more specifically the bend 465g of the inlet leg 426, and an outlet leg 470. The outlet leg 470 has a thermal spacing portion 472 and an outlet leg heat transfer portion 474 formed integrally with the straight sensing portion 446. The outlet leg thermal spacer portion includes a 90° bend 472a, a straight portion 472b and a 90° bend 472c. The inlet leg heat transfer portion 464 and the outlet leg heat transfer portion 474 are coupled by an isothermal means comprising a heat conductive winding 476 which holds the inlet leg heat transfer portion 464 and the outlet leg heat transfer portion 474 tightly together in good thermal conduction, the winding 476 comprises an isothermal means for coupling the inlet leg heat transfer portion 464 and the outlet leg heat transfer portion in substantial thermal equilibrium i.e., at the same temperature. Alternatively, the inlet leg heat transfer portion 464 and the outlet leg heat transfer portion 474 tube may be held in intimate thermal contact for good thermal conduction by solder, braze or cement. This holds the heat transfer portions 464 and 474 at a relatively low temperature substantially equal to the temperature of the gas in the upstream portion of the bypass, while the straight sensing leg 446 and the gas therein is at a higher temperature due to heating by electric current fed through thermally responsive element 434 wound about the straight sensing leg 446. This allows the gas in the straight sensing leg 446 to remain substantially stratified therein by density as when the heated gas flows down the thermal spacer leg 472, it cools increasing its density, so that the least dense gas is always trapped at the upper portion of the U defined by the inlet leg 460, the straight sensing leg 446 and the outlet leg 470, thereby preventing convective flow through the sensor tube 434 and causing the sensor tube 434 to remain substantially convectively stable. The output leads 442, 440 and 444 are connected to the circuit 500 which is identical with the circuit 80 shown in FIG. 7 and which drives the valve 404 in the identical manner in which the circuit 80 drives the valve 14.

The instant thermal mass flow sensor 405 thus provides a high stability sensor with substantial thermal symmetry at zero flow rate which allows the mass flow meter to have its bypass flow path 406 positioned in a substantially vertical direction while avoiding perturbation of the readings through the flow sensor by induced convective flow as may occur with the prior art.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A thermal mass flow sensor for use in a thermal mass flow meter having a bypass carrying a flow of gas in a bypass flow direction, comprising:

a sensor tube having a gas inlet for receiving a sensor portion of the gas from the upstream bypass portion, said sensor tube having a first convection trap and a second convection trap for preventing convective flow of the sensor portion of the gas through the sensor tube, one of said first and second convection traps having a first leg parallel with the bypass for carrying the sensor portion of the gas parallel with the flow of gas through the bypass and having a second parallel leg for carrying the sensor portion of the gas antiparallel with the flow of gas through the bypass, said sensor tube having a gas outlet for exhausting the sensor portion of the gas; and a thermally responsive element in good thermal conduction with said sensor tube for energization from a source of electrical energy, an electrical characteristic of the thermally responsive element being responsive to the rate of flow of the sensor portion of the gas through said sensor tube.

2. A thermal mass flow sensor for use in a thermal mass flow meter having a bypass carrying a flow of gas in a bypass flow direction as defined in claim 1, wherein said first convection trap comprises a first portion of said sensor tube curved in a first direction and said second convection trap comprises a second portion of said sensor tube curved in a second direction.

3. A thermal mass flow sensor for use in a thermal mass flow meter having a bypass carrying a flow of gas in a bypass flow direction as defined in claim 2, wherein said thermally responsive element comprises a thermally responsive winding wound about a third portion of said sensor tube which is positioned between said first of said sensor tube portion of said sensor tube and said second portion.

4. A thermal mass flow sensor for use in a thermal mass flow meter having a bypass carrying a flow of gas in a bypass flow direction as defined in claim 3, wherein said thermally responsive winding comprises an upstream thermally responsive winding and a downstream thermally responsive winding.

5. A thermal mass flow meter for measuring a mass rate of flow of a gas, comprising:

a bypass receiving a stream of gas to be metered and having an upstream bypass portion, a flow restricter connected to said upstream bypass portion to provide a pressure drop, and a downstream bypass portion connected to said flow restricter, a bypass portion of the stream of gas flowing in a bypass flow path from the upstream bypass portion through the flow restricter and out the downstream bypass portion;

a sensor tube having a gas inlet connected to said upstream bypass portion for receiving a sensor portion of the gas, said sensor tube having a first convection trap and a second convection trap for preventing convective flow of the sensor portion the gas through said sensor tube, one of said first and second convection traps having a first leg parallel with the bypass flow path for carrying the sensor portion of the gas parallel with the bypass portion flowing through the bypass and having a second leg substantially parallel with the bypass flow paths for carrying the sensor portion of the gas substantially opposite in direction to the bypass flow path, said sensor tube having a gas outlet connected to said downstream bypass portion for exhausting the sensor portion of the gas to said downstream bypass portion; and a thermally responsive element in good thermal conduction with said sensor tube for energization from a source of electrical energy, an electrical characteristic of said thermally responsive element being responsive to the rate of flow of the sensor portion of the gas through said sensor tube.

6. A thermal mass flow meter for measuring a mass rate of flow of a gas as defined in claim 5, wherein said first convection trap comprises a first portion of said sensor tube curved in a first direction and said second convection trap comprises a second portion of said sensor tube curved in a second direction.

7. A thermal mass flow meter for measuring a mass rate of flow of a gas as defined in claim 6, wherein said thermally responsive element comprises a thermally responsive winding wound about a third portion of said sensor tube which is positioned between said first portion and said second portion.

8. A thermal mass flow meter for measuring a mass rate of flow of a gas as defined in claim 6, wherein said thermally responsive winding comprises an upstream thermally responsive winding and a downstream thermally responsive winding.

9. A thermal mass flow controller for controlling a mass rate of flow of a gas, comprising:

a bypass receiving a stream of gas to be metered and having an upstream bypass portion, a flow restricter connected to said upstream bypass portion, and a downstream bypass portion connected to said flow restricter, a bypass portion of the stream of gas flowing in a bypass flow path from the upstream bypass portion through the flow restricter and out the downstream bypass portion, the pressure of the bypass portion of the gas being lower in the downstream bypass portion than in the upstream bypass portion;

a sensor tube having a gas inlet connected to said upstream bypass for receiving a sensor portion of the gas, said sensor tube having a first convection trap for preventing convective flow of the sensor portion of the gas in a first direction, said sensor tube having a second convection trap for preventing convective flow of the sensor portion of the gas in a second direction, one of said first and second convection traps having a first leg substantially parallel with the bypass flow path for carrying the sensor portion of the gas parallel with the bypass portion of the gas flowing through the bypass and having a second leg substantially parallel with the bypass flow path for carrying the sensor portion of the gas substantially opposite in direction to the bypass flow path, said sensor tube having a gas outlet connected to said downstream bypass portion for exhausting the sensor portion of the gas to said downstream bypass portion;

a thermal sensing element in good thermal conduction with said sensor tube for energization from a source of electrical energy, an electrical characteristic of said thermal sensing element being responsive to the rate of flow of the sensor portion of the gas through said sensor tube, said thermal sensing element providing a flow rate signal; and means coupled to said thermal sensing element to receive the flow rate signal and coupled to the bypass flow path to receive the flow of gas for modulating the rate of flow of the gas in response to the flow rate signal.

10. A thermal mass flow controller for controlling a mass rate of flow of a gas as defined in claim 9, wherein said thermal sensing element comprises a resistance winding having a temperature dependent resistance.

* * * * *